(12) United States Patent
Kunz et al.

(10) Patent No.: US 12,103,626 B2
(45) Date of Patent: Oct. 1, 2024

(54) RIM MAGNET ARRANGEMENT FOR FIXING A MAGNET ON A RIM BY WAY OF A STEM OF A VALVE

(71) Applicant: Robert Bosch GmbH, Stuttgart (DE)

(72) Inventors: Jonas Kunz, Reutlingen (DE); Juergen Stegmaier, Wannweil (DE)

(73) Assignee: ROBERT BOSCH GMBH, Stuttgart (DE)

( * ) Notice: Subject to any disclaimer, the term of this patent is extended or adjusted under 35 U.S.C. 154(b) by 143 days.

(21) Appl. No.: 17/882,685

(22) Filed: Aug. 8, 2022

(65) Prior Publication Data

US 2023/0056129 A1 Feb. 23, 2023

(30) Foreign Application Priority Data

Aug. 19, 2021 (DE) .................. 10 2021 209 110.5

(51) Int. Cl.
| | | |
|---|---|---|
| B62J 45/423 | (2020.01) | |
| B60C 29/02 | (2006.01) | |
| B62J 45/412 | (2020.01) | |

(52) U.S. Cl.
CPC ............. *B62J 45/423* (2020.02); *B60C 29/02* (2013.01); *B62J 45/412* (2020.02)

(58) Field of Classification Search
CPC ........ B62J 45/423; B62J 45/412; B60C 29/02
See application file for complete search history.

(56) References Cited

U.S. PATENT DOCUMENTS

| | | | | |
|---|---|---|---|---|
| 6,854,335 | B1* | 2/2005 | Burns | B60C 23/0425 73/728 |
| 7,490,700 | B2* | 2/2009 | Watarai | G01P 3/487 188/24.11 |
| 10,675,929 | B1* | 6/2020 | Baiz | F16K 27/08 |
| 2007/0251580 | A1* | 11/2007 | Perry | B60C 29/066 137/382 |
| 2021/0140549 | A1* | 5/2021 | Sunayama | F16K 27/0209 |
| 2021/0221185 | A1* | 7/2021 | Benevelli | B60C 23/00318 |
| 2022/0032680 | A1* | 2/2022 | Meggiolan | B60B 21/062 |

FOREIGN PATENT DOCUMENTS

| | | |
|---|---|---|
| DE | 69000873 T2 | 6/1993 |
| DE | 202004013524 U1 | 10/2004 |
| DE | 202007001665 U1 | 9/2007 |
| DE | 602006000736 T2 | 5/2009 |
| DE | 102010042808 A1 | 4/2012 |
| DE | 202016003819 U1 | 6/2016 |
| DE | 102017212924 A1 | 1/2019 |
| DE | 102018210754 A1 | 7/2019 |
| DE | 102018211282 A1 | 1/2020 |
| EP | 3435024 A1 | 1/2019 |
| EP | 3766710 A1 | 1/2021 |

* cited by examiner

*Primary Examiner* — Dominic E Hawkins
(74) *Attorney, Agent, or Firm* — NORTON ROSE FULBRIGHT US LLP; Gerard A. Messina

(57) ABSTRACT

A rim magnet arrangement for fixing on a stem of a valve. The rim magnet arrangement includes a magnet, and
a fixing device, which is configured to fix the magnet on the stem of the valve in an axial direction of the stem, and
an anti-twist protection, which is configured to fix the magnet in a circumferential direction of the stem.

16 Claims, 8 Drawing Sheets

RIM MAGNET ARRANGEMENT FOR FIXING A MAGNET ON A RIM BY WAY OF A STEM OF A VALVE

CROSS REFERENCE

The present application claims the benefit under 35 U.S.C. § 119 of German Patent Application No. DE 10 2021 209 110.5 filed on Aug. 19, 2021, which is expressly incorporated herein by reference in its entirety.

FIELD

The present invention relates to a rim magnet arrangement for fixing a magnet on a rim by way of a stem of a valve, said rim magnet arrangement including a magnet, which is arranged in a housing.

The present invention further relates to a rim arrangement for a bicycle or the like, including a rim magnet arrangement and a rim.

The present invention further relates to a method for producing a rim magnet arrangement.

Although the present invention is applicable to any rims, it will be explained in relation to rims of bicycles.

BACKGROUND INFORMATION

For measuring the speed of bicycles, a pulse generator in the form of a magnet may be fastened on a spoke, and each circulation of the magnet on the wheel is detected by way of a magnetic field sensor, which is arranged on a part of the bicycle's frame. Based on the time difference between two consecutive passes of the magnet, and on the tire circumference, the speed of the bicycle may be determined, as is described, e.g., in German Patent Application No. DE 10 2017 212 924 A1.

SUMMARY

In one specific example embodiment, the present invention provides a rim magnet arrangement for fixing on a stem of a valve, the rim magnet arrangement including:
a magnet,
a fixing device, which is configured to fix the magnet on the stem of the valve in an axial direction of the stem, and an anti-twist protection, which is configured to fix the magnet in a circumferential direction of the stem.

In one specific example embodiment, the present invention provides a rim arrangement for a bicycle or the like, including a rim magnet arrangement according to the one as described above, and a rim, wherein the magnet is axially and rotationally fixed on the rim by way of the fixing device and the anti-twist protection.

In one specific example embodiment, the present invention provides a method for producing a rim magnet arrangement as described above, wherein the housing is produced by a 2-component injection-molding method.

One of the advantages achieved thereby is a simple and reliable fixing of a magnet on a rim by way of the stem of the valve. Furthermore, it is an advantage that the fixing of the magnet may take place on a plurality of different rims. A further advantage is a particularly reliable detection of the speed of travel of a magnet fixed on a rim by way of the rim magnet arrangement. The magnet may in particular be in the form of a permanent magnet.

Further features, advantages, and further specific example embodiments of the present invention are described below or will become apparent thereby.

According to one advantageous development of the present invention, the magnet is arranged in a housing, which is in particular made of plastics. This has the advantage that the magnet is protected from environmental influences.

According to a further advantageous development of the present invention, the fixing device includes a screw device, which is screwable onto the stem of the valve. A reliable and detachable fixing of the magnet on a rim is thus possible.

According to a further advantageous development of the present invention, the housing includes at least one resilient element, which is configured so as to protrude on the housing in an axial direction of the stem, and in particular is configured so as to taper partially inwards towards the middle of the housing. In this way, a pre-tension may be created in an axial direction, allowing particularly reliable fixing on the valve. If, for example, the tire pressure drops, the valve protrudes further out of the rim. This may be compensated by way of the pre-tension. Furthermore, the at least one resilient element may also provide an anti-twist protection by partially abutting against the rim in a form-fitting manner.

According to a further advantageous development of the present invention, at least two, in particular four, resilient elements are arranged, which are arranged symmetrically on the housing, and in particular are configured identically. In this way, a particularly high pre-tension and a particularly secure anti-twist protection may be provided.

According to a further advantageous development of the present invention, the anti-twist protection includes a shaped sleeve, which has at least one recess or protrusion, and which engages in a corresponding protrusion or recess of the magnet and/or the housing thereof. In this case, the shaped sleeve is in particular configured so as to be self-locking. One of the advantages achieved thereby is that a simple and, at the same time, reliable fixing of the magnet on the stem of the valve is made possible.

According to a further advantageous development of the present invention, the anti-twist protection is formed by an adhesive, in particular in the form of double-sided adhesive tape, applied to the magnet and/or the housing thereof. In this way, particularly rapid and simple fixing of the magnet on the stem of the valve is possible.

According to a further advantageous development of the present invention, the anti-twist protection includes a clamp having a U-shaped cross-sectional profile, which is fixable on the stem and is configured to prevent rotation in the fixed state of the magnet by way of a form-fitting connection with the magnet and/or with the housing on the one hand, and at least partially with a rim on the other hand. One of the advantages achieved thereby is that a simple fixing of the magnet on the rim is thus made possible. The U-shaped profile is in particular to be understood not only as a profile with right angles, but also a trough-shaped profile or the like.

According to a further advantageous development of the present invention, the anti-twist protection includes a bore having smaller dimensions than the diameter of the stem in the magnet's housing. One advantage of this is that few components are needed for fixing the magnet.

According to a further advantageous development of the present invention, the anti-twist protection includes at least one friction-enhancing element. In this way, a particularly reliable anti-twist protection is provided.

According to a further advantageous development of the present invention, the anti-twist protection includes a press sleeve, which is arranged on the stem of the valve. The press sleeve may preferably be made of rubber. An advantage of this is a simple anti-twist protection provided by deformation. In this case, a sleeve may additionally be arranged on the stem of the valve together with the press sleeve, in particular above it.

According to a further advantageous development of the present invention, the anti-twist protection is provided by elastic material of the magnet's housing. An advantage of this is an anti-twist protection without additional components.

According to a further advantageous development of the present invention, the magnet is configured in one piece, and the magnet and, in particular, the housing includes a bore which is, in particular, central, each bore corresponding to the other, for fixing on the stem of the valve. In this way, the magnet and the housing thereof may simply be placed on the stem of the housing and fixed by way of the fixing device.

According to a further advantageous development of the present invention, the magnet is configured in two pieces, and a receiving device for the two parts of the magnet is arranged in the housing. One of the advantages achieved thereby is that a laborious and complicated fixing of a single magnet, in particular by way of a central bore, is thereby avoided.

According to a further advantageous development of the present invention, the magnet is arranged such that it provides a magnetic field perpendicular to the axial direction of the stem of the valve, or parallel to the axial direction thereof. In this way, a reliable detection of the magnet's magnetic field is provided, in particular if the magnetic field is oriented perpendicular to the axial direction of the stem of the valve.

Further important features and advantages of the present invention are derived from the figures, and from the associated description of the figures with reference to the figures.

It is understood that the features mentioned above and the features to be explained in the following are usable not only in the indicated combinations but also in other combinations or as stand-alone features without leaving the scope of the present invention.

Preferred variants and specific embodiments of the present invention are illustrated in the figures, and will be explained in greater detail in the following description, wherein the same reference characters relate to identical or functionally equivalent components or elements.

DETAILED DESCRIPTION OF EXAMPLE EMBODIMENTS

Figure 1:
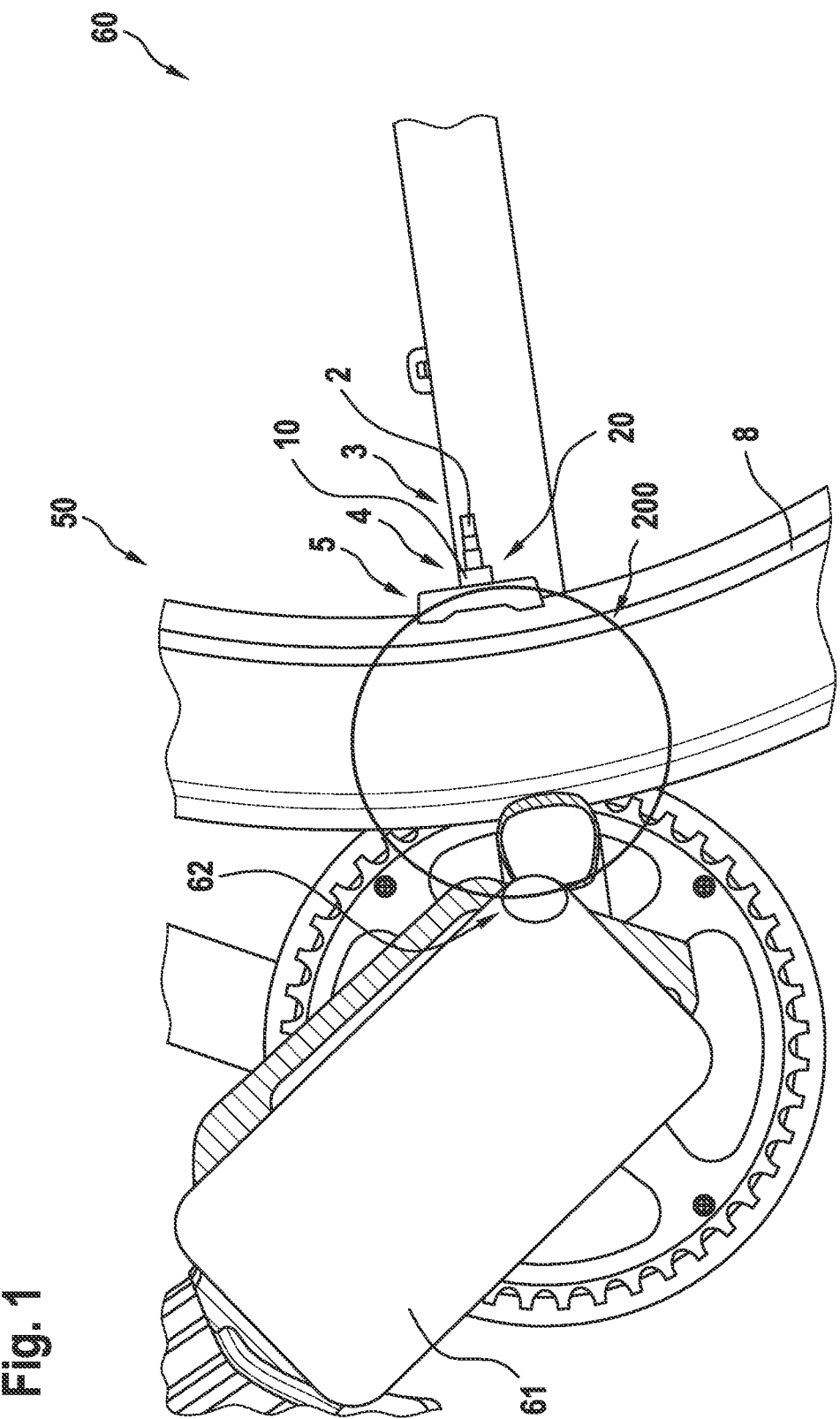
FIG. 1 shows a partial side view of a bicycle in the region of the bicycle's drivetrain.

FIG. 1 is a partial side view of a bicycle in the region of the bicycle's drivetrain.

In FIG. 1, a bicycle 60 is shown in the region of drivetrain 61. In a conventional manner, drivetrain 61 includes a magnetic field sensor 62 integrated therein. Furthermore, a rim arrangement 50 with rim magnet arrangement 1 is shown with a rim 8, which includes a valve 3. Valve 3 includes a valve stem 2, onto which a magnet 4 arranged in a housing 5 is placed. Housing 5 and magnet 4 include a central bore 20 for this purpose. The bottom of housing 5 rests on rim 8 of bicycle 60. Both are then fixed on stem 2 of valve 3 by way of a mounting nut 10. Magnet 4 provides a magnetic field 200, which may be measured by magnetic field sensor 62.

Figure 2A:
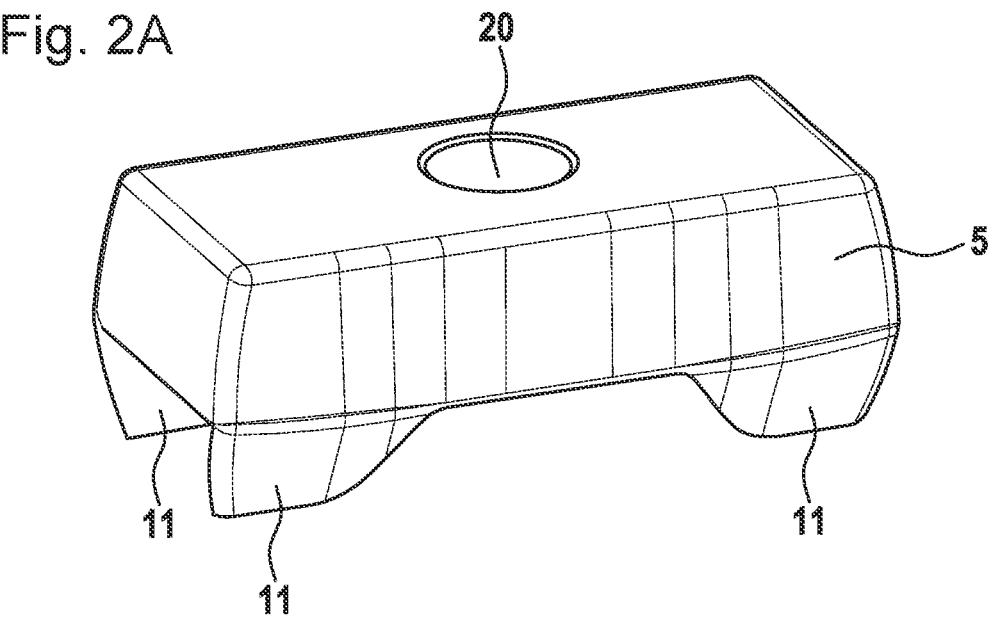
FIG. 2A shows a rim magnet arrangement according to a specific example embodiment of the present invention.

FIG. 2A shows a rim magnet arrangement according to a specific embodiment of the present invention.

In FIG. 2A, a rectangular magnet 4 arranged in a substantially rectangular housing 5 is shown. To prevent housing 5 from twisting when the bicycle is being ridden, the housing includes a constructional anti-twist protection. The anti-twist protection is formed here by flexible or elastic fins 11, which can adapt to the particular rim shape and are configured so as to protrude in an axial direction of stem 2 and project partially inwards in a radial direction. A second function of elastic fins 11 consists in applying a pre-tension, which then restrains mounting nut 10 and prevents magnet 4 with housing 5 from coming loose during operation.

Figure 2B:
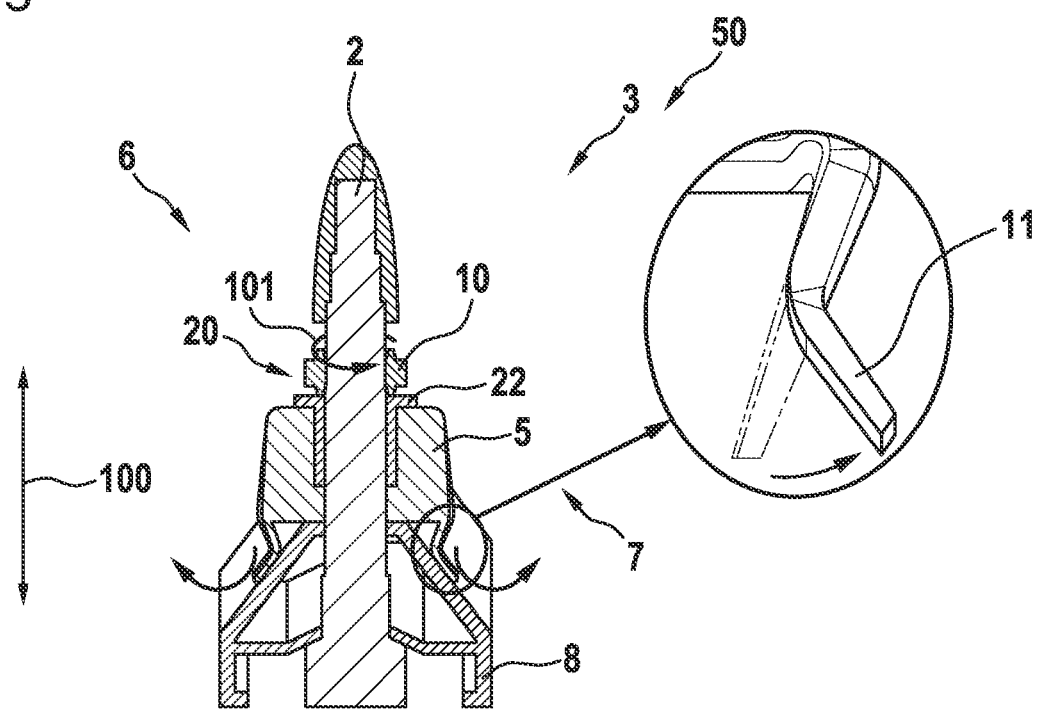
FIG. 2B shows a rim arrangement according to a specific embodiment of the present invention.

FIG. 2B shows a rim arrangement according to a specific embodiment of the present invention.

In FIG. 2B, magnet 4 together with housing 5 mounted by way of a fixing device 6 is shown fixed on stem 2 of a valve 3. To this end, magnet 4 is first pushed over valve 3—more precisely stem 2 of valve 3—in axial direction 100 of stem 2 until flexible fins 11 touch rim 8. The component, i.e., magnet 4 and housing 5 thereof, includes an opening or bore 20, which has the diameter of the largest valve stem diameter to be covered, e.g., that of a Schrader valve. For a Presta valve, an adapter sleeve 22, as shown here, may be inserted between stem 2 and bore 20 of component 4, 5. Valve nut 10 is then screwed onto valve 3 until it rests on adapter sleeve 22. Valve nut 10 now presses the component onto rim 8 by way of adapter sleeve 22. Flexible fins 11 are pressed onto the flanks of rim 8 and partially adapt to the shape of rim 8. Valve nut 10 is now tightened further, in particular by hand. Valve nut 10 of fixing device 6 now presses adapter sleeve 22 onto housing 5 of magnet 4. Since flexible fins 11 have a certain rigidity, this system is now pre-tensioned. The principle here corresponds to that of a leaf spring. The wider the rim 8 and the more acute the flank angle of rim 8, the more pre-tensioning force is generated since fins 11 are pressed further apart. An additional pre-tensioning force may be designed into the component by executing fins 11 such that they already taper inwards towards the middle of component 4, 5 in an unloaded state, as shown in FIGS. 2A and 2B.

This pre-tension prevents magnet 4 from twisting sideways in a circumferential direction 101 of stem 2. Since the pre-tensioning force acts in particular between valve nut 10 and component 4, 5, it also prevents loosening of valve nut 10 at the frictional connection. A change in the pre-tensioning force occurs in particular as a result of pressure variations in the tire on rim 8. For example, as a result of pumping up the tire or inner tube, valve 3 is pushed further out of rim 8 and the pre-tensioning force decreases. The pre-tensioning force through fins 11 in this case is sufficiently high to ensure an adequate anti-twist protection and an adequate restraining effect on valve nut 10 even in the event of pressure variations. The pre-tensioning force needed for the application may be adjusted by selecting the material with regard to elasticity, and the material thickness of fins 11 in the design of component 4, 5. Effective anti-twist protection is provided by in particular at least two fins 11, but there may be more, e.g., four fins 11 as illustrated. If tubeless valves are used, an O-ring is often employed, which is inserted between rim 8 and valve nut 10. In order to be able to employ magnet 4 together with housing 5 even with tubeless valves, in a further specific embodiment, which is not illustrated here, a recessed groove may be formed on the flank-facing side of component 4, 5 in the region of bore 20, which groove accommodates the O-ring. In this way, the bottom of component 4, 5 can still rest on rim 8 without an air gap.

Figure 3:
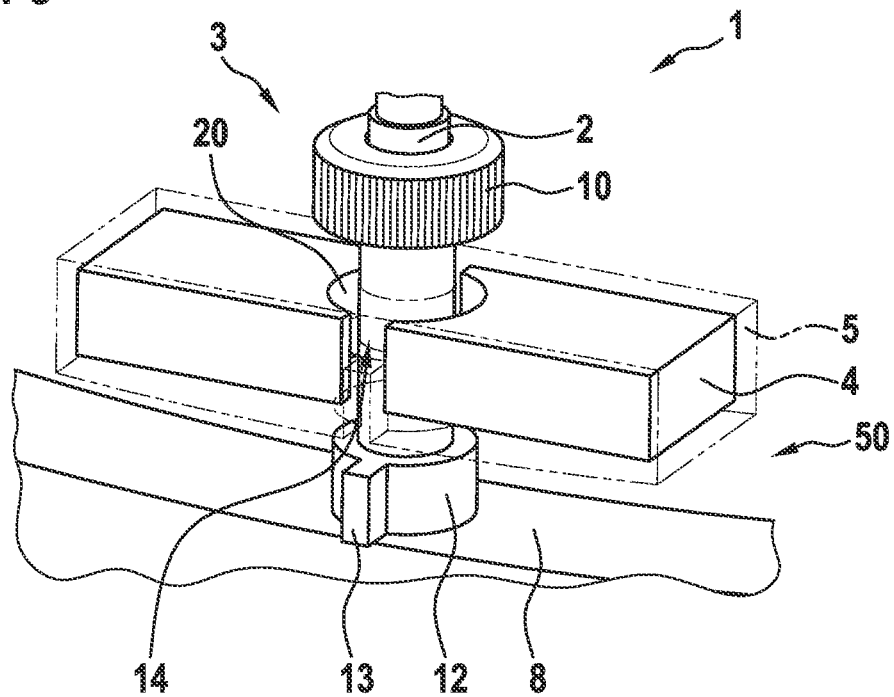
FIG. 3 shows a rim arrangement according to a specific embodiment of the present invention.

FIG. 3 shows a rim arrangement according to a specific embodiment of the present invention.

In FIG. 3, a rim arrangement 50 is shown. The anti-twist protection 7 here includes a shaped sleeve 12, which is screwed onto stem 2 of valve 3. Over this, magnet 4 together with housing 5 is placed by way of bore 20. Component 4, 5 is then screwed tightly in place by way of valve nut 10. Shaped sleeve 12 has a defined outer contour 13, the negative 14 of which is copied in housing 5, in particular in the form of an overmolding 5 of magnet 4, here a protrusion 13 and a corresponding recess 14. Component 4, 5 may thus be fitted accurately. Shaped sleeve 12 is designed so as to be self-locking. In this way, it is ensured that magnet 4 together with housing 5 is secured against twisting. The holding shape of shaped sleeve 12 is also designed so as to facilitate screwing to valve 3. In this case, one type of shaped sleeve may be provided for Sclaverand valves and one type for Schrader valves.

Advantages of this specific embodiment may include:
Component 4, 5 as a whole may have a very simple and slim design
Shaped sleeve 12 may be produced as a simple injection-molded part
Component 4, 5 may be produced cost-effectively and simply in a large batch size
Component 4, 5 may be used with almost all rim shapes FIG. 4 shows a rim arrangement according to a specific embodiment of the present invention.

Figure 4:
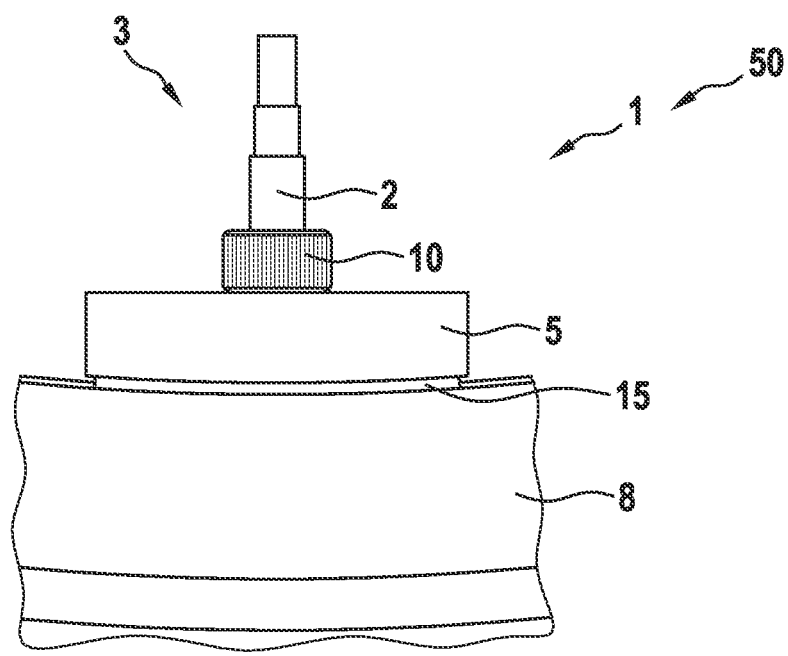
FIG. 4 shows a rim arrangement according to a specific embodiment of the present invention.

In FIG. 4, an anti-twist protection 7 of a rim arrangement 50 is now shown in the form of double-sided adhesive tape 15.

Before component 4, 5 is installed, double-sided adhesive tape 15 is applied on the side of housing 5 of magnet 4 facing rim 8 to the left and right of central bore 20. Component 4, 5 is then placed on stem 2 of valve 3 and pressed onto adhesive tape 15. Component 4, 5 is then screwed tightly in place by way of valve nut 10. Adhesive tape 15 also prevents component 4, 5—and in particular therefore magnet 4—from lifting should valve nut 10 come loose in the event of pressure variations in the tire on rim 8.

Advantages of this specific embodiment may include:
Magnet 4 and component 4, 5 as a whole may have a very simple and slim design
Conventional, and therefore cost-effective, double-sided adhesive tape may be used
Component 4, 5 may be produced cost-effectively and simply in a large batch size
Component 4, 5 may be used with almost all rim shapes
High reliability, since component 4, 5 remains fixed on the rim even in the event of pressure variations FIG. 5 shows a rim arrangement according to a specific embodiment of the present invention, and FIG. 6 a rim arrangement according to FIG. 5 in cross-section.

Figure 5:
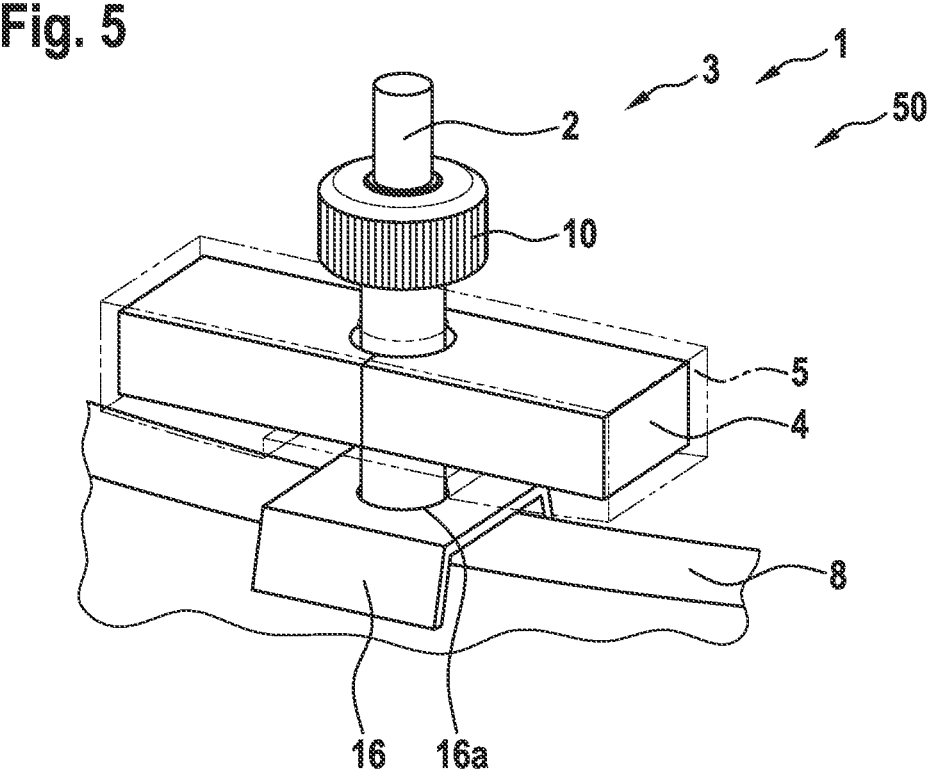
FIG. 5 shows a rim arrangement according to a specific embodiment of the present invention.
Figure 6:
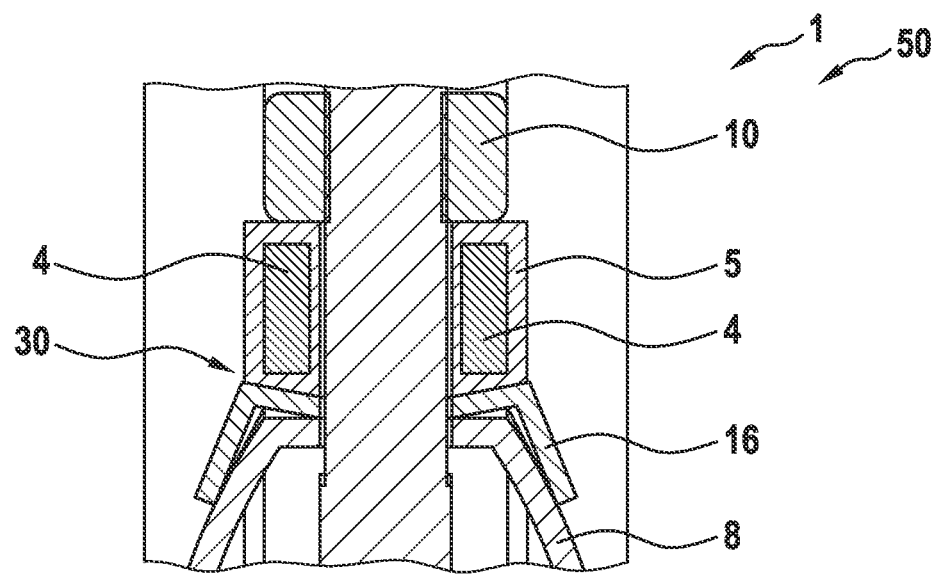
FIG. 6 shows a rim arrangement according to FIG. 5 in cross-section.

In FIGS. 5 and 6, a rim arrangement 50 is shown with an anti-twist protection 7 in the form of a securing clamp 16.

This securing clamp 16, which is partially configured so as to be flexible, is placed on stem 2 of valve 3 here by way of a bore 16a. Component 4, 5 is placed thereover with central bore 20 and is pressed firmly against rim 8. Component 4, 5 is then screwed tightly in place by way of valve nut 10. The shape of securing clamp 16 is configured such that, when it is applied in an unloaded state onto rim 8, it does not adapt to the shape thereof or bend. Only when a pressing force is applied to securing clamp 16 is securing clamp 16 pressed apart, and partially adapts to the shape of rim 8. The material of securing clamp 16 is selected such that, by being pressed onto rim 8, securing clamp 16 acts as a spring. This results in a pre-tensioning force. The shape of securing clamp 16 is copied in negative form in housing 5 of magnet 4, so that, with the appropriate pressing force, a form-fitting connection 30 is provided between securing clamp 16 and housing 5. In combination with the pre-tensioning force generated, an anti-twist protection 7 is now ensured in this way. Furthermore, the described system is tensioned against valve nut 10, ensuring that pressure variations are compensated and valve nut 10 is prevented from coming loose. By varying the shape and/or cross-sectional profile of securing clamp 16, almost all known rim shapes may be copied.

Possible advantages of this specific embodiment are:
Magnet 4 and component 4, 5 as a whole may have a very simple and slim design
Securing clamp 16 may be readily adapted to different rim shapes
Securing clamp 16 may be used with almost all rim shapes
Component 4, 5, and thus magnet 4, does not come loose from rim 8 in the event of pressure variations in the tire.

Figure 7A:
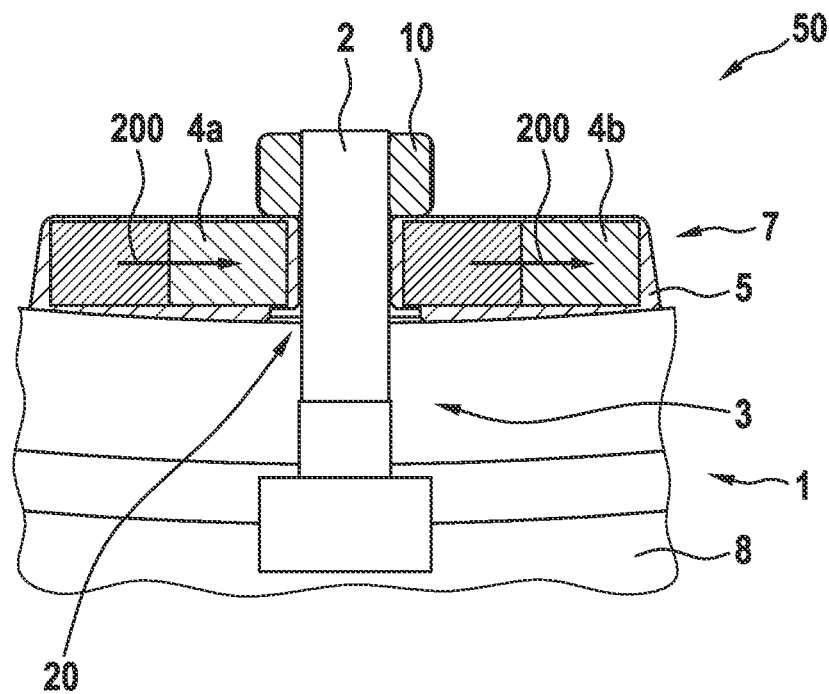
FIGS. 7A, 7B, 7C show rim arrangements each according to a specific embodiment of the present invention
Figure 7B:
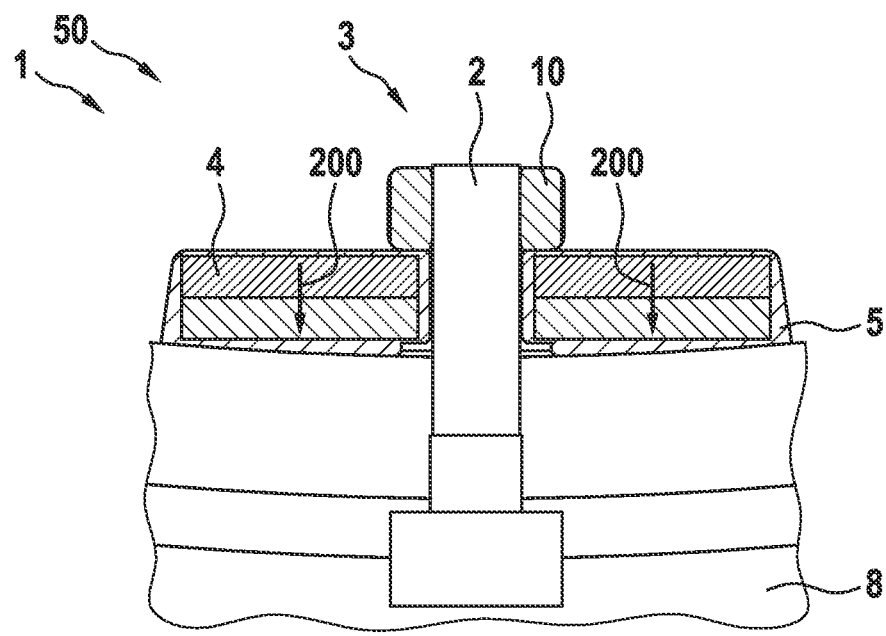
Figure 7C:
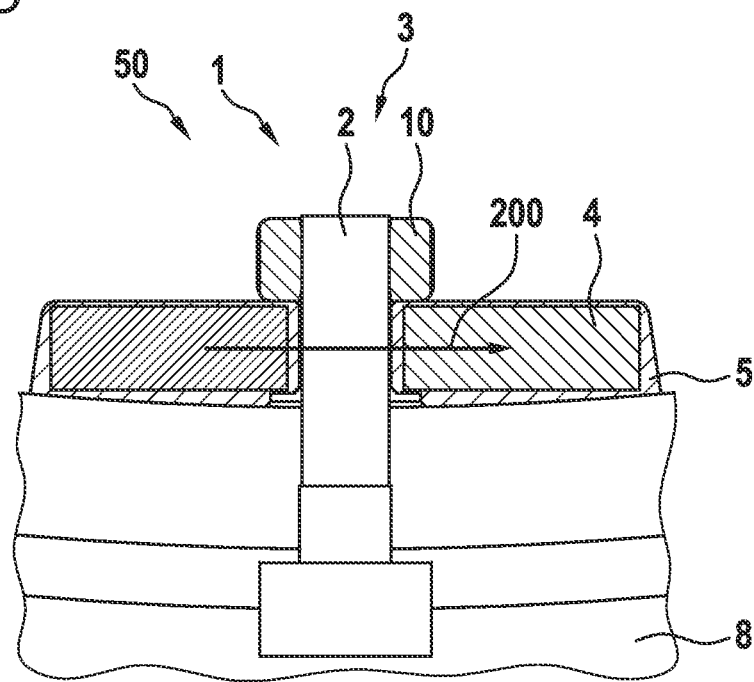

FIGS. 7A, 7B, 7C show rim arrangements each according to a specific embodiment of the present invention.

In each of FIGS. 7B and 7C, a component 4, 5 is shown in the form of a mono magnet. Mono magnet 4, 5 includes two components: a monolithic magnet block 4 and a plastics overmolding 5. For mounting on stem 2 of a valve 3, mono magnet 4, 5 includes a central hole or bore 20. Depending on the execution of the evaluation algorithm, mono magnet 4, 5 may be polarized either according to its length, as illustrated in FIG. 7C with magnetic field direction 200, or according to its height, as in FIG. 7B, i.e., perpendicular to the direction shown in FIG. 7C—magnetic field direction 200.

In FIG. 7A, a component 4, 5 is shown, wherein magnet 4 is configured in two pieces with parts 4a, 4b. The two parts 4a, 4b here are arranged such that they have a common magnetic field direction 200—perpendicular to the axis of stem 2 of valve 3 here. In contrast to the specific embodiment of FIG. 9, the two parts 4a, 4b are directly overmolded with overmolding 5 and not arranged separately in a holder as in FIG. 9.

Overmolding 5 protects magnet 4 from the effects of weathering and excessive stress. To avoid its twisting when the bicycle is being ridden, component 4, 5 includes an anti-twist protection 7, which is formed by overmolding 5, i.e., by housing 5 of magnet 4. Anti-twist protection 7 may be implemented similarly to the specific embodiment of FIGS. 2A, 2B by flexible and/or elastic fins 11, which adapt to the rim shape. A second function of elastic fins 11, as already stated, consists in applying a pre-tension, which restrains valve nut 10 and prevents component 4, 5 from coming loose during operation. The material of overmolding 5 is selected in particular such that it has on the one hand sufficient strength to absorb the forces of valve nut 10, and on the other hand sufficient flexibility for lateral fins 11 to be able to adapt to any rim shape. One possible advantage of this specific embodiment is that magnet 4 and component 4, 5 as a whole may have a very simple, slim, and unobtrusive design.

Figure 8:
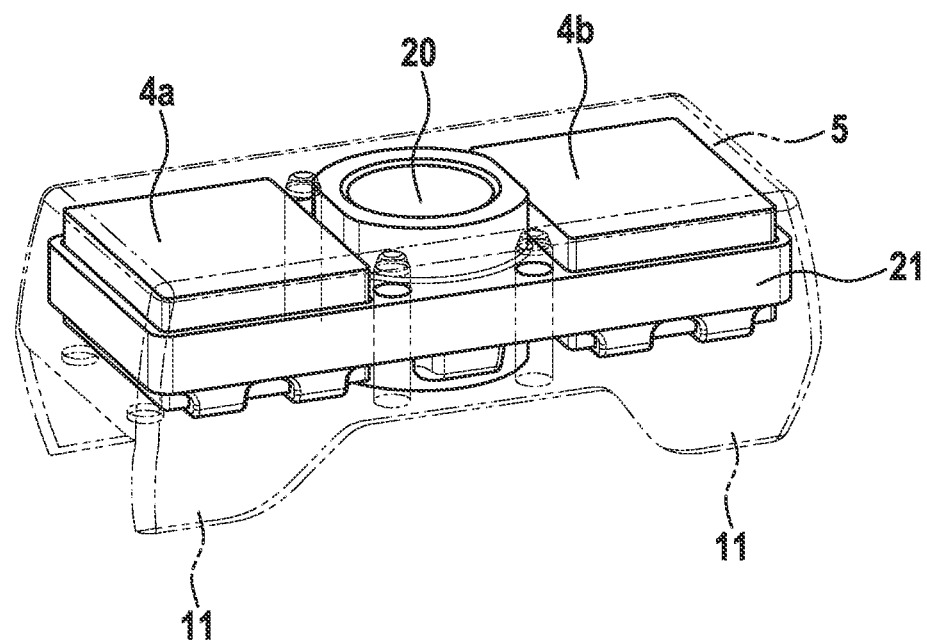
FIG. 8 shows a rim magnet arrangement according to a specific example embodiment of the present invention.
Figure 9:
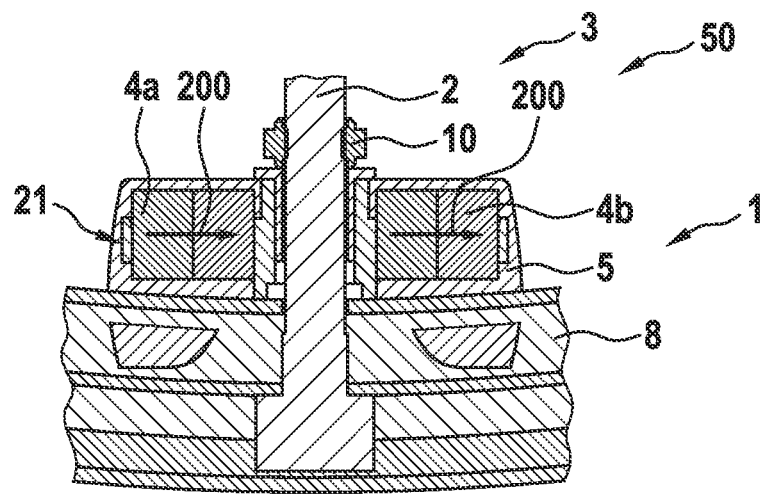
FIG. 9 shows a rim arrangement according to a specific example embodiment of the present invention.

FIG. 8 shows a rim magnet arrangement according to one specific embodiment of the present invention, and FIG. 9 a rim arrangement according to one specific embodiment of the present invention.

In FIG. 8, a component 4, 5 is shown, which includes two identical individual magnets 4a, 4b, which are arranged in a common holder 21 inside a housing 5, which is formed by overmolding the two magnets 4a, 4b, according to the specific embodiment of FIGS. 2A and 2B. Individual magnets 4a, 4b may act as signal generators. Depending on the execution of the evaluation algorithm, individual magnets 4a, 4b may be polarized either according to their length, as illustrated in FIG. 9 with magnetic field direction 200, or according to their height, i.e., perpendicular to the direction shown in FIG. 9 in the plane of the drawing of FIG. 9. The holder or holding cage 21 assumes two functions. On the one hand, it holds individual magnets 4a, 4b in position during the overmolding operation, and on the other hand it absorbs the screwing forces and stabilizes component 4, 5. Fins 11 provide the pre-tensioning force and anti-twist protection described in the description relating to FIGS. 2A, 2B.

Possible advantages of this specific embodiment are:
More cost-effective design owing to higher magnet production runs
More stable design In the following specific embodiments, anti-twist protection 7 is implemented by enhancing the coefficient of friction between magnet 4 or housing 5, as applicable, and rim 8.

Figure 10:
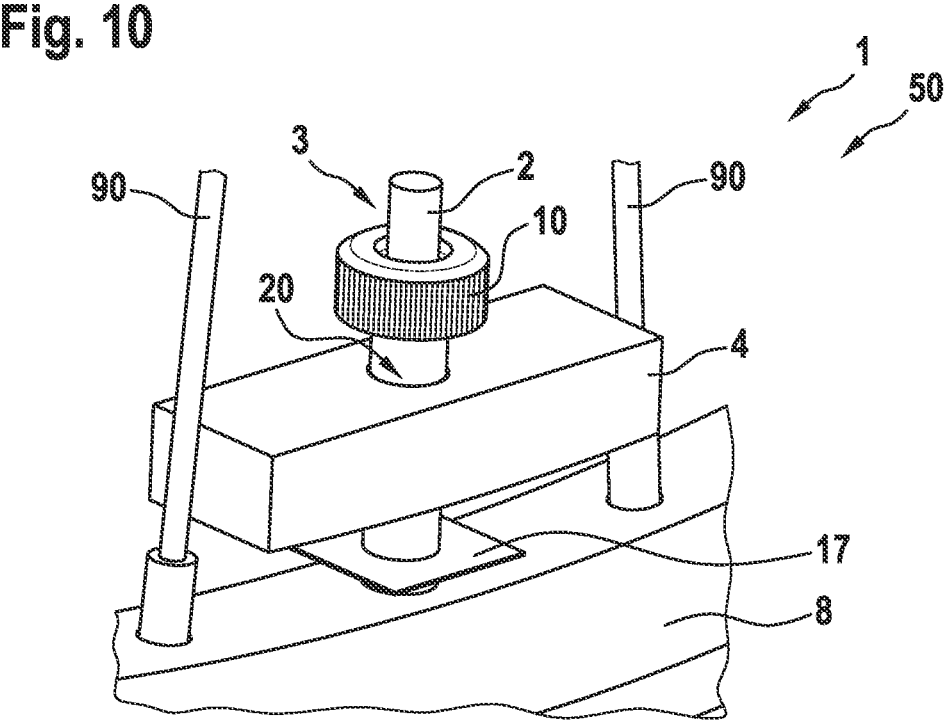
FIG. 10 shows a rim arrangement according to a specific example embodiment of the present invention.

FIG. 10 shows a rim arrangement according to a specific embodiment of the present invention.

In FIG. 10, a rim arrangement 50 is shown, which is arranged between two adjacent spokes 90 of a wheel. Here, one or more friction shims, i.e., friction washers, 17, are arranged between the bottom of the housing of component 4, 5—or, if magnet 4 has no housing, between the bottom of magnet 4—and rim 8. These friction shims 17 are configured such that their diameter is adapted to Sclaverand and Schrader valves, and they copy the contact surface of magnet 4 or housing 5 thereof in the immediate vicinity of bore 20. The shim or shims 17 are placed over stem 2 of valve 3. Component 4, 5 is then placed thereover and then valve nut 10 is screwed onto stem 2 of valve 3 and tightened. Microinterlocks are formed between friction shim 17 and housing 5, and between friction shim 17 and rim 8. In this way, the coefficient of friction may be at least doubled, thus ensuring an anti-twist protection 7.

Figure 11:
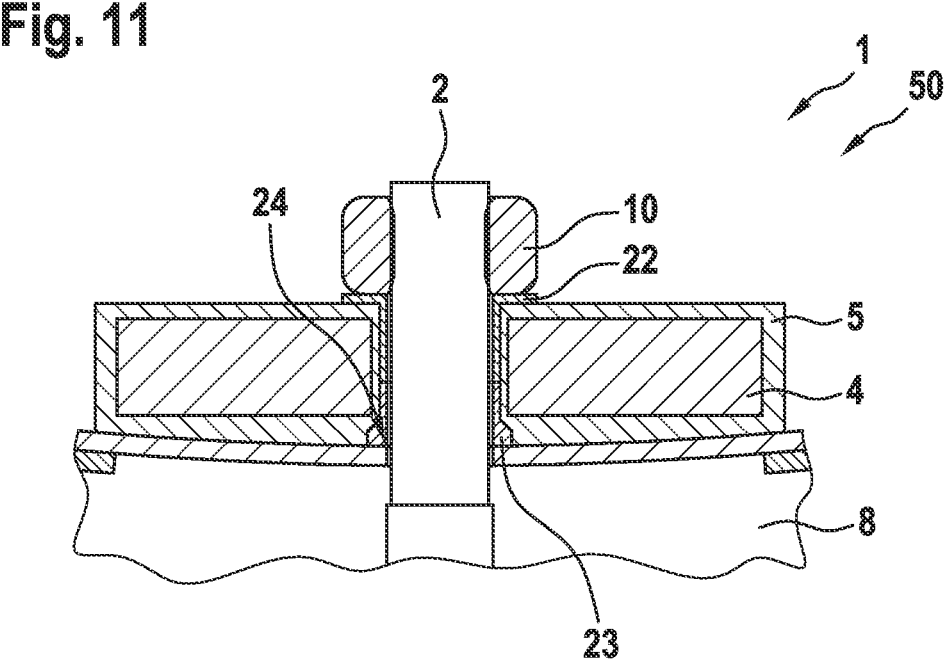
FIG. 11 shows a rim arrangement according to a specific example embodiment of the present invention.

FIG. 11 shows a rim arrangement according to a specific embodiment of the present invention.

In the specific embodiment shown in FIG. 11, anti-twist protection 7 is created by a rubber sleeve 23, which is compressed and is thus pressed between valve thread and wall of bore 20 of component 4, 5. To this end, rubber sleeve 23 is placed over stem 2 of valve 3. Component 4, 5 is then placed onto rubber sleeve 23 and pressed onto rim 8. A further sleeve 22 made of inelastic material is subsequently inserted so far into bore 20 of component 4, 5 that it rests on rubber sleeve 23. Valve nut 10 is now screwed onto stem 2 of valve 3 and tightened until inelastic sleeve 22 is seated with its collar on component 4, 5. As a result, rubber sleeve 23 is deformed to such an extent that it is compressed between valve thread and wall of bore 20 (reference numeral 24). In this way, an anti-twist protection 7 is ensured.

Possible advantages of this specific embodiment are:
Component 4, 5 may have a very simple and slim design
Simple, cost-effective manufacture in large batch sizes
All rim shapes may be used
Component 4, 5 does not come loose in the event of pressure variations in the tire FIG. 12 shows a rim arrangement according to a specific embodiment of the present invention.

Figure 12:
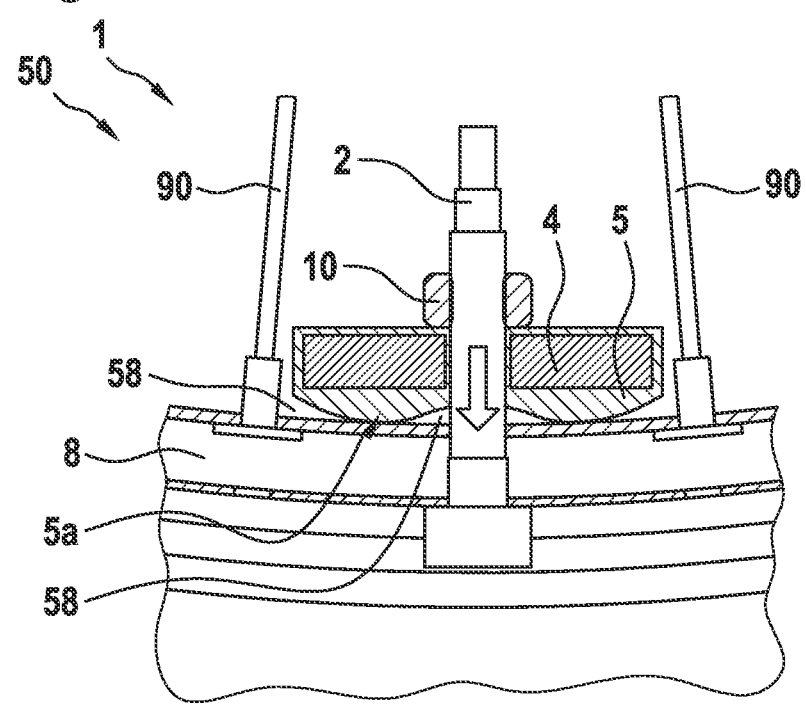
FIG. 12 shows a rim arrangement according to a specific example embodiment of the present invention.

In the specific embodiment shown in FIG. 12, anti-twist protection 7 is created by the material of housing 5 of magnet 4. Magnet 4 is overmolded with an elastomer 5a, which has a high coefficient of friction and deforms at least partially. The design of overmolding 5a is selected such that overmolding 5a is deformed and tensioned against the bottom of component 4, 5 when screwed in place on stem 2 of valve 3. In particular, as illustrated in FIG. 12, overmolding 5a is not flat in relation to the surface of rim 8, but is selected such that, when overmolding 5a is applied, cavities 58 are formed between housing 5 and rim 8. When screwed in place, the elastomer is deformed, and cavities 58 are filled by the elastomer. As a result of the force thus generated, component 4, 5 is tensioned against valve nut 10. In combination with the enhanced coefficient of friction between elastomer and, for example, an aluminum rim, anti-twist protection 7 is ensured. Moreover, the system is tensioned against valve nut 10, making the system less susceptible to pressure variations.

Possible advantages of this specific embodiment are:
Component 4, 5 may have a very simple and slim design
Simple, cost-effective manufacture in large batch sizes
All rim shapes may be used
Component 4, 5 does not come loose in the event of pressure variations in the tire Specific embodiments that are not illustrated will be described below.

In one specific embodiment, which is not shown here, anti-twist protection 7 is provided by the fact that the greatest part of central bore 20 in component 4, 5 has smaller dimensions than stem 2 of valve 3. In particular, the first three turns of the valve thread are cut in the lower part of bore 20 in the region of rim 8. Component 4, 5 is now fixed by being screwed onto stem 2 of valve 3. During this operation, the thread of valve 3 cuts into the wall of bore 20 of the housing, which is in the form of an overmolding here. The material of the overmolding is selected such that, on the one hand, the thread is cut, and, on the other hand, friction on the thread turns of stem 2 of valve 3 is high. In this way, an anti-twist protection 7 may be ensured. Variability between Sclaverand and Schrader valves is ensured in particular by the fact that the wall of bore 20 is selected to be sufficiently thick that a simple reboring of Sclaverand core hole diameter to Schrader core hole diameter is possible. Valve nut 10 may be screwed on as additional protection. Possible advantages of this specific embodiment are:

Component 4, 5 may have a very simple and slim design
Valve variability may be readily achieved by a mechanic, customer, or the like
Simple, cost-effective manufacture in large batch sizes
All rim shapes may be used
Component 4, 5 does not come loose in the event of pressure variations in the tire
Valve nut is no longer required and may be dispensed with In summary, at least one of the embodiments of the present invention has at least one of the following advantages:

Simple, cost-effective manufacture, in particular in large batch sizes
Simple fixing
Reliable fixing both axially and in a circumferential direction on the valve stem
Position on the rim is not sensitive to pressure variations
Few components for fixing Overall, a mono magnet 4 may have at least one of the following properties:

Remanence between 1.30 T and 1.4 T, in particular between 1.32 T and 1.35 T
Length: 35 mm-50 mm, in particular 40-45 mm
Width: 10-20 mm, in particular 12.5-17.5 mm
Height: 5-20 mm, in particular 6-9 mm
Weight (without/with housing): 15-20 g/20-30 g
Degree of magnetization at least N45, at least grade M, in particular grade H Overall, a component 4, 5 having a two-part magnet 4 may have at least one of the following properties:

Remanence between 1.40 T and 1.5 T, in particular between 1.42 T and 1.48 T
Length: 35 mm-50 mm, in particular 40-45 mm
Width: 10-20 mm, in particular 12.5-17.5 mm
Height: 5-20 mm, in particular 6-9 mm
Individual magnet length: 10 mm-20 mm, in particular 12-15 mm
Individual magnet width: 10-20 mm, in particular 12.5-17.5 mm
Individual magnet height: 5-20 mm, in particular 6-9 mm
Weight (without/with housing): 15-20 g/20-30 g
Degree of magnetization at least N45, in particular N52, at least grade M Although the present invention was described on the basis of preferred exemplary embodiments, it is not limited thereto but is modifiable in various ways.

What is claimed is:

1. A rim magnet arrangement for fixing a magnet on a rim by way of a stem of a valve, the rim magnet arrangement comprising:
   the magnet;
   a fixing device configured to fix the magnet on the stem of the valve in an axial direction of the stem; and
   an anti-twist protection configured to fix the magnet in a circumferential direction of the stem,
   wherein the magnet is a rectangular-shaped magnet arranged in a substantially rectangular-shaped housing made of plastic.

2. The rim magnet arrangement as recited in claim 1, wherein the fixing device includes a screw device which is screwable onto the stem of the valve.

3. The rim magnet arrangement as recited in claim 1, wherein the housing includes at least one resilient element, which is configured so as to protrude on the housing in an axial direction of the stem, and is configured so as to taper partially inwards towards a middle of the housing.

4. The rim magnet arrangement as recited in claim 3, wherein at least two resilient elements are arranged symmetrically on the housing, and are configured identically.

5. The rim magnet arrangement as recited in claim 3, wherein four resilient elements are arranged symmetrically on the housing, and are configured identically.

6. The rim magnet arrangement as recited in claim 1, wherein the anti-twist protection includes a shaped sleeve, which has at least one recess or protrusion, which engages in a corresponding protrusion or recess of the magnet and/or the housing.

7. The rim magnet arrangement as recited in claim 1, wherein the anti-twist protection is formed by an adhesive applied to the magnet and/or the housing, in the form of double-sided adhesive tape.

8. The rim magnet arrangement as recited in claim 1, wherein the anti-twist protection includes a clamp having a U-shaped cross-sectional profile, which is fixable on the stem, and which is configured to prevent rotation in the fixed state of the magnet by way of a form-fitting connection with the magnet and/or with the housing on the one hand, and at least partially with a rim on the other hand.

9. The rim magnet arrangement as recited in claim 1, wherein the anti-twist protection includes a bore having smaller dimensions than a diameter of the stem in the housing of the magnet.

10. The rim magnet arrangement as recited in claim 1, wherein the anti-twist protection includes at least one friction-enhancing element.

11. The rim magnet arrangement as recited in claim 1, wherein the anti-twist protection includes a press sleeve, which is arranged on the stem of the valve, and/or is provided by elastic material of the housing of the magnet.

12. The rim magnet arrangement as recited in claim 1, wherein the magnet is configured in one piece, and the magnet and the housing include a bore, which is central, each bore corresponding to the other bore, for fixing on the stem of the valve.

13. The rim magnet arrangement according to claim 1, wherein the magnet is configured in two pieces and a receiving device for the two pieces of the magnet is arranged in the housing.

14. The rim magnet arrangement as recited in claim 1, wherein the magnet is arranged such that it provides a magnetic field perpendicular to an axial direction of the stem of the valve, or parallel to the axial direction.

15. A method for producing a rim magnet arrangement, the method comprising:
   providing a magnet in a housing made of plastic, the housing being produced by a two-component injection molding method;
   providing a fixing device configured to fix the magnet on the stem of the valve in an axial direction of the stem; and
   providing an anti-twist protection configured to fix the magnet in a circumferential direction of the stem,
   wherein the magnet is a rectangular-shaped magnet arranged in a substantially rectangular-shaped housing made of plastic.

16. A rim magnet arrangement for fixing a magnet on a rim by way of a stem of a valve, the rim magnet arrangement comprising:
   the magnet;
   a fixing device configured to fix the magnet on the stem of the valve in an axial direction of the stem; and an anti-twist protection configured to fix the magnet in a circumferential direction of the stem,
wherein the anti-twist protection includes a clamp having a U-shaped cross-sectional profile which is fixable on the stem.

* * * * *